Figure 1:
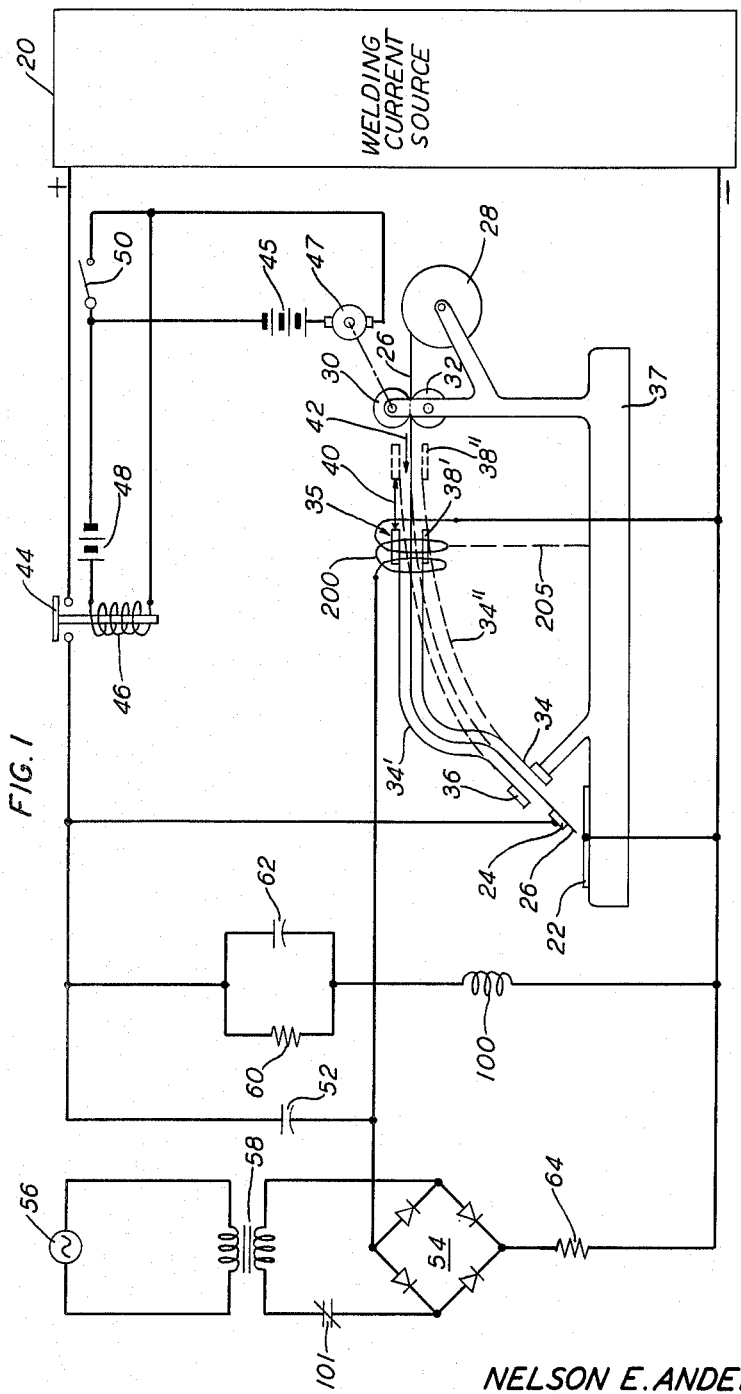

May 31, 1966 N. E. ANDERSON 3,254,197
ARC STARTING
Filed Sept. 13, 1963 2 Sheets-Sheet 1

NELSON E. ANDERSON, DECEASED
BY SEVERA B. ANDERSON,
ADMINISTRATRIX
BY Edmund W Bopp
Agent

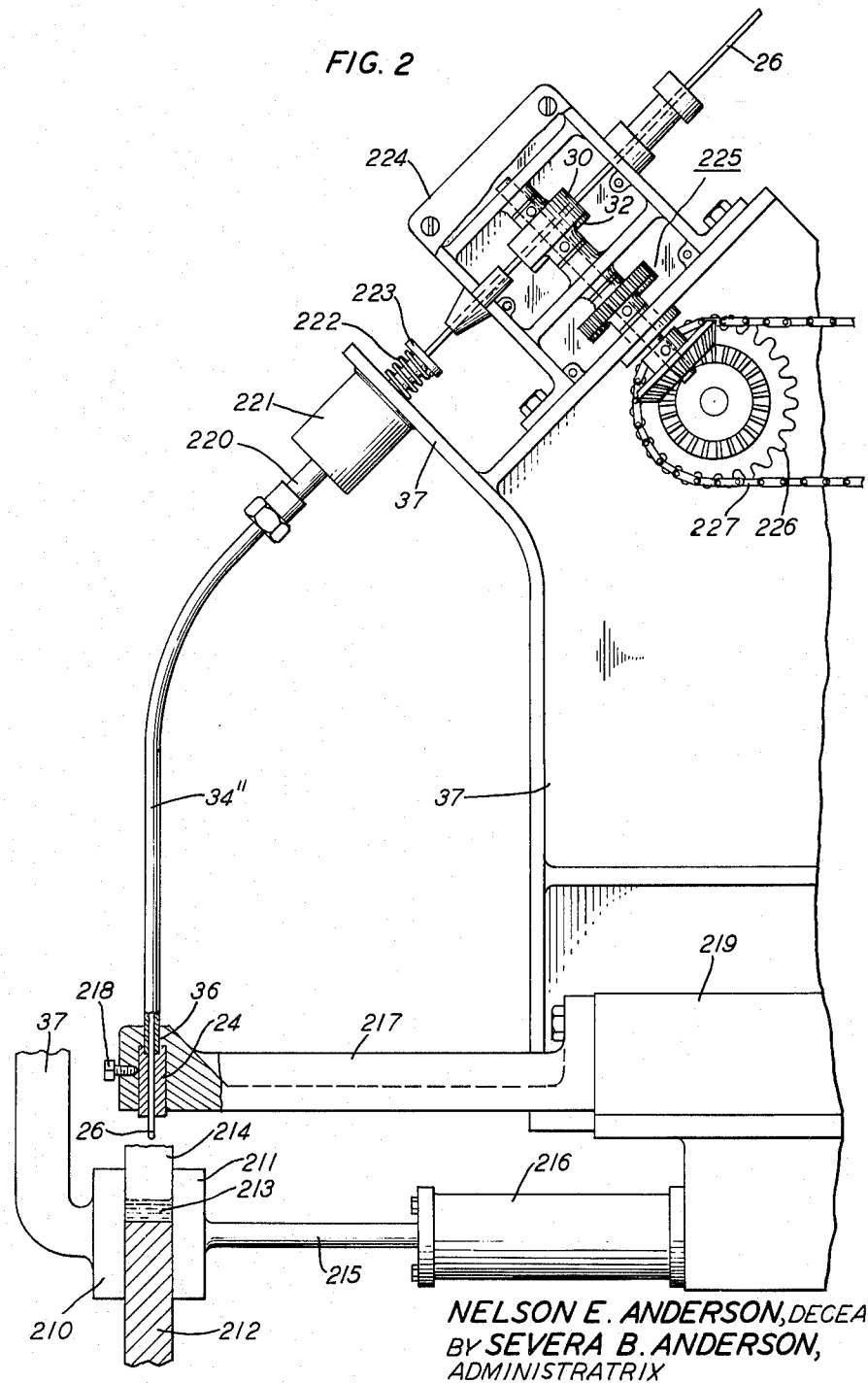

3,254,197
ARC STARTING

Nelson Edward Anderson, deceased, late of Berkeley Heights, N.J., by Severa B. Anderson, administratrix, Berkeley Heights, N.J., assignor to Air Reduction Company, Incorporated, New York, N.Y., a corporation of New York
Filed Sept. 13, 1963, Ser. No. 309,376
10 Claims. (Cl. 219—131)

This invention relates to the starting of power arcs by drawing apart two touching electrodes between which current is passing, and more particularly to the case wherein one electrode is continuously consumed in the power arc and must be advanced at a sufficiently rapid rate to supply the metal to be deposited by the arc and to prevent the arc from being extinguished by becoming unduly lengthened.

In welding with relatively non-consuming electrodes, it is possible to start the power arc by touching the electrodes together momentarily and then separating them by a suitable distance, whereupon the arc may be maintained in good operating condition. This spacing distance may be kept substantially constant, except for making up for the unavoidable relatively slow consumption of the electrode or electrodes. In copending application, Serial No. 176,026, filed February 27, 1962, now Patent No. 3,133,187, assigned to the same assignee as the present application, there is described and shown apparatus and methods for touch starting power arcs between relatively non-consuming electrodes, providing automatic control of the starting process.

The situation is more complicated when a consuming electrode is involved as will be evident when it is considered that the consuming electrode must first be advanced until it touches the workpiece or other electrode, then be retracted to an operating distance, and thereupon and thereafter must continuously advance at the necessary rate to maintain the arc length substantially constant as the electrode is being consumed in the arc.

It is an object of my invention to extend the the advantages of automatic touch starting to power arc operations involving the use of a consuming electrode.

Another object is to effect touch starting while employing an electrode feed mechanism that is continuously and positively advancing the electrode in the general direction of the power arc both during and after the touch starting operation.

Stated differently, an object is to perform a touch starting operation while continuously advancing a consuming-type electrode without interfering with the continuous operation of the electrode feed mechanism.

In accordance with the invention, there is fed a consuming type electrode in the form of a flexible wire from a storage reel to feed rollers of known type and thence through a tubular guide member to the vicinity of the workpiece or other electrode in known manner. Also as usual, the end of the guide tube nearest the arc region is fixed in position relatively to the feed rollers. However, in contradistinction to the usual arrangement, instead of a rigid guide tube both ends of which are fixed in position relatively to the feed rollers, there is used an arrangement whereby the end of the guide tube nearest the feed rollers can be displaced in such manner as to change the length of wire included between the feed rollers and the point of contact of the wire and workpiece. The wire is advanced by the feed rollers usually at substantially constant speed. When the wire touches the workpiece, a current is set up which actuates a solenoid which in turn suddenly displaces the movable end of the guide tube to lengthen the distance along the path which the wire is constrained to follow from the feed rollers to the point of contact of the wire and the workpiece. This causes the electrode wire to be retracted abruptly from contact with the workpiece to a distance which may be predetermined to be suitable for maintaining a proper power arc between the wire and the workpiece while at the same time striking the arc in known manner. There is no interruption nor slowing of the advance of the wire through the feed rollers and the wire is fed into the arc at the desired speed required to maintain the arc length substantially constant as the wire is melted and the metal thereof is deposited upon the workpiece as desired. There is provided a holding current circuit for maintaining the solenoid in actuated condition as long as the use of the arc continues. To permit the requisite displacement of one end of the guide tube while the other end is held fixed, the guide tube is preferably made sufficiently flexible for the purpose. The displacement of the movable end of the guide tube may be in any direction provided it changes the length of wire included between the feed rollers and the fixed end of the guide tube. To avoid undue friction between the wire and the guide tube during the displacement, an axial movement of the movable end relative to the axis of the guide tube is preferred. The operation of shifting the guide tube is preferably integrated into automatic or semi-automatic means for starting, timing and stopping the operation of the power arc.

In order to effect retraction of the wire it is necessary that the linear speed at which the movable end of the guide tube increases the wire path length shall be greater than the wire feed speed, and the rate of retraction depends in fact upon the average difference between these two speeds. Accordingly, the speed of movement of the movable end of the guide tube may be adjusted to secure the desired speed of retraction of the wire.

Other features, objects and advantages will appear from the following more detailed description of an illustrative embodiment of the invention, which will now be given in conjunction with the accompanying drawings.

In the drawings,

FIGURE 1 is a combined electrical and mechanical schematic diagram of a preferred embodiment of the invention; and FIGURE 2 is an elevational view of an illustrative embodiment including certain mechanical features of the arrangement shown schematically in FIGURE 1.

Referring to the drawings, and more particularly to FIGURE 1, a welding current source 20, is shown, preferably one having a drooping characteristic relationship between arc current and arc voltage, so that when the arc gap length is increased, thereby increasing the voltage across the arc, the arc current decreases, and conversely so that when the arc gap length is decreased, thereby decreasing the voltage across the arc, the arc current increases; imparting a substantial stability to the arc gap length in known manner. The source 20 is shown connected between a workpiece 22 and an arc electrode contactor 24 for reverse polarity welding, that is, with the positive terminal of the source 20 connected to the arc electrode through the contactor 24 and the negative terminal of the source 20 connected to the workpiece 22. The arc electrode is shown at 26 and constitutes a consumable wire stored on a reel 28. The wire 26 is advanced into the arc region by means of conventional feed rolls 30, 32 and passes through a wire guide tube 34. The end of the guide tube 34 nearer the arc region is anchored at 36 to a framework 37 that supports this end of the guide tube in fixed relation to the feed rolls. The guide tube 34 is preferably a flexible tube having the end thereof nearer the feed rolls movable by means of a solenoidal operating winding 200 and armature 35 as indicated by an arrow 40 while the direction of feed of the electrode wire 26 represented by an arrow 42. Motion of the movable end of the guide tube varies the spacing between the movable end of the guide tube and the feed rolls 30, 32, thereby varying the length of wire required to reach from the feed rolls to the workpiece.

In FIGURE 1, the wire 26 is shown spaced apart from the workpiece 22 and the wire guide 34 is shown by full lines in the flexed position 34' with the armature 35 in the position 38', farthest from the feed rolls 30, 32. The non-flexed position of the wire guide 34 is shown in dotted lines at 34" with the armature 35 in the position 38", nearest to the feed rolls.

A conventional welding contactor 44 is shown for preparing the welding current circuit by connecting the positive terminal of the source 20 to the arc electrode contactor 24. The contactor 44 may be actuated in the usual manner by means of a solenoid winding 46 energized by current from a suitable source represented by a battery 48, by closing a starting switch 50. At the same time, the switch 50 may connect a power source represented by a battery 45 to a motor 47 for driving the feed roll 30, or feed rolls 30 and 32.

The solenoid winding 200 and a capacitor 52 in series therewith are connected in parallel with the arc electrode-workpiece circuit as shown. A source of direct current is provided for energizing the winding 200, illustrated as a conventional full-wave rectifier 54 supplied with alternating current from a source 56 through a transformer 58 and a normally closed series contactor 101 of a relay having its operating winding 100 connected in parallel with the arc electrode-workpiece circuit as shown. In series with the winding 100 is the parallel combination of a protective resistor 60 and a capacitor 62. A protective resistor 64 may be connected as shown between the rectifier 54 and the solenoid winding 200. The solenoid winding is anchored to the framework 37 as indicated schematically by a dotted line 205.

In an illustrative case, the actual displacement between the position 38' and 38" may be as little as 1/16 to 1/8 inch, and the exact amount will depend upon the actual welding conditions. In FIGURE 1, the distance between the positions as shown at 38' and 38" has been exaggerated and the change of shape of the guide tube 34 has been exaggerated, in order to bring out clearly the manner in which the tip of the wire at 26 is caused to move in response to motion of the armature.

In the operation of the arrangement shown in FIGURE 1, at the outset it will be assumed that the starting switch 50 is open, that there is a physical gap between the electrode wire 26 and the workpiece 22, that the relay winding 100 is de-energized so that contact 101 is closed, and that the transformer 58 is energized so that the solenoid winding 200 is energized and the movable end of the wire guide is at position 38', its farthest distance from the feed rolls, as shown in full line, and also that the feed rolls are not being driven. The transformer 58 is designed to provide secondary current sufficient when rectified at 54 to actuate the winding 200. At no time is current through capacitor 52 sufficient to actuate the winding 100, the latter being designed to be actuated by the higher current that may be passed through it by the welding current source 20.

Operation of the system is begun by closing the switch 50, thereby connecting the battery 48 to the solenoid winding 46 and causing the contactor 44 to close the welding circuit. The welding current source 20 is thereby connected to supply, for example, about 80 volts to the relay winding 100, actuating the relay and causing the contact 101 to open. At the same time the feed rolls are set in motion due to the closing of the switch 50. The opening of the contact 101 breaks the supply circuit of the winding 200, permitting a biasing spring (not shown) to move the end of the guide tube to its position 38" closest to the feed rolls and advancing the electrode 26 toward the workpiece 22. It will be noted also that with the open arc gap the current from the source 20 charges up the capacitor 52.

The electrode wire 26 is now driven by the feed rolls until it touches the workpiece, causing a short circuit and thereby removing operating voltage from the relay winding 100, thereby causing that relay to release and close the supply circuit of the solenoid winding 200 at the contact 101. Energization of the solenoid winding 200 in this way is, however too slow, so advantage is first taken of the fact that when the wire 26 touches the workpiece, the charged capacitor 52 discharges through the short circuit thus formed, thereby sending sufficient current through the winding 200 to actuate the solenoid and cause the guide tube 34 to move to the full line position. The guide tube is held in this position by the subsequent energization of the winding 200 by the current from the rectifier 54 which occurs in time to prevent the solenoid from being de-energized as the capacitor 52 becomes discharged.

The movement of the guide tube between the position 38" and 38' is arranged to occur with a greater linear speed than the wire feed speed, with the result that the tip of the wire 26 is withdrawn from contact with the workpiece 22 notwithstanding the steady advancement of the wire 26 accomplished by the feed rolls. The retraction of the wire 26 from the workpiece is accompanied by the starting of the arc which very quickly settles down to a steady state in which the electrode wire is melted away and deposited upon the workpiece, the linear rate of melting of the wire being equal on the average to the linear rate of advancement of the wire by the feed rolls.

The normal voltage across the operating arc is insufficient to actuate the relay winding 100, as this relay is a marginal relay selected to require for its operation a voltage between the wire 26 and the workpiece of considerably more than the normal arc voltage, for example 50 volts. Therefore, when the arc is established the winding 100 remains de-energized, the contact 101 remains closed, and the rectifier is enabled to supply holding current to the winding 200 to maintain the guide tube in the magnetically held position 38'. Welding may now proceed in normal manner.

Should the arc become extinguished during a welding operation, the voltage across the arc gap increases rapidly to a value which causes winding 100 to be actuated, thus causing winding 200 to be de-energized and causing the guide tube 34 to move to the spring held position 38". At the same time, the welding current source 20 recharges the capacitor 52. The feed rolls continue to advance the electrode wire, which soon touches the workpiece again, restarting the arc; and the circuit from then on operates as it does following an initial start.

At the finish of a welding operation, the switch 50 may be opened, causing the contactor 44 to break the welding circuit and that of the feed rolls 30, 32. The transformer 58 may remain energized ready for the start of another welding operation, or may be de-energized until needed just before the next start.

The capacitor 62 and resistor 60 are useful for speeding up the responsive action of the relay winding 100, while also protecting the winding 100 from excessive voltage impressed by the welding current source 20. When the welding current source is suddenly connected to the open arc gap, the source 20 sends a momentary current pulse through the capacitor 62 which acts like a short circuit around the resistor 60 during the initial part of the time interval required to charge the capacitor 62 to a steady state value. The resistor 60 limits the steady state value of the current in the winding 100 to a safe value.

FIGURE 2 shows an illustrative physical embodiment of the invention in a machine for automatic vertical welding. A first welding dam 210, fixed relatively to a portion of the frame 37 of the welding machine, is shown in cooperative relation to a second welding dam 211 which latter is movable relatively to the frame 37. The dams 210 and 211 cooperate in known manner to confine molten weld material in a gap extending vertically between two workpieces to be joined. Welding proceeds in upward direction in the gap, the dams being gradually raised as the work progresses. As the weld material solidifies, the dams aid in shaping the exposed surfaces of the weld material. In FIGURE 2, a portion 212 of solidified weld material is shown in cross section between the dams 210 and 211. Above the solidified portion 212 is shown the molten portion 213 of the weld material confined between the dams. Above and behind the molten portion 213 is a fragment 214 of the edge of one of the plates being welded. The arc supporting terminal 26 of the consumable wire electrode is shown approximately centered over the molten pool 213. The frame 37 is supported by suspension from above, preferably in such manner as is shown in a copending application, Serial No. 296,349, filed July 19, 1963, by Stanley A. Agnew, Eugene Koch and Frank G. Ferraioli, assigned to the same assignee as the present application. The dam 211 may be made movable by means of a piston rod 215 actuable by a pneumatic cylinder 216, attached to the frame 37, as also shown in the above cited application.

In FIGURE 2, the contact tube 24 is shown secured in a bracket 217 by means of a set screw 218. The bracket 217 may be attached to a slidable block 219 by means of which the electrode tip 26 may be adjusted in the horizontal direction in the plane of the paper, to center the tip 26 with respect to the thickness of the workpieces, which thickness corresponds in the figure to the spacing between the welding dams 210 and 211. Provision may be made, if desired, for oscillating the bracket 217 and electrode tip 26 horizontally in the plane of the paper to aid in spreading the deposited metal evenly over the space between the welding dams after the arc has been established.

FIGURE 2 also shows the wire feed mechanism, the solenoid for striking the arc, and the guide tube which encloses the electrode wire. The lower end of the guide tube is shown at 36, affixed to the bracket 217 adjacent to the contact tube 24. The guide tube in this embodiment includes a hollow plunger 220 of a solenoid 221 and is shown in its non-flexed position 34″, with its movable end appearing at a shoulder 223 at the right hand most end of the plunger 220. The solenoid 221 is attached rigidly to the frame 37. The plunger 220 is spring loaded by means of a coiled spring 222 confined for compression between the frame 37 and the shoulder 223 on the upper end of the plunger. The wire drive mechanism is contained in a housing 224 attached to the frame 37. The electrode wire is driven through the housing by the drive wheels 30 and 32, driven by gearing 225, a sprocket wheel 226 and a chain 227 coupled to a motor (not shown) mounted on the frame 37. The wire in the wire drive mechanism between the wheels 30 and 32 is preferably aligned with the center axis of the plunger 220 of the solenoid. When the solenoid is energized, the plunger 220 is moved downwardly, against the force of the spring 222, thereby flexing the guide tube and withdrawing the contained electrode wire upward away from the arc region.

While illustrative forms of apparatus and methods in accordance with the invention have been described and shown herein, it will be understood that numerous changes may be made without departing from the general principles and scope of the invention.

What is claimed is:

1. The method of striking an arc between the arc supporting terminals of cooperating electrodes, one of which is a consuming electrode, comprising the steps of continuously advancing the said consuming electrode past a fixed point located a predetermined distance from the arc supporting terminal of the second cooperating electrode, at a predetermined speed, guiding the arc supporting terminal of the consuming electrode continuously toward the arc supporting terminal of the second cooperating electrode, touching the said electrode terminals together, and immediately thereupon displacing the portion of consuming electrode between the arc region and the said fixed point in such direction and at a sufficient rate of speed as to cause the arc supporting terminal of the consuming electrode to be withdrawn from contact with the said second cooperating electrode at a rate exceeding said predetermined speed, thereby striking an arc between the electrode terminals, and thereupon retaining the consuming electrode in the displaced configuration while continuing to guide the consuming electrode into the arc region.

2. The method of striking an arc between the arc supporting terminals of cooperating electrodes, one of which is a consuming electrode, comprising the steps of continuously advancing the said consuming electrode toward the arc region along a defined path including two points fixed relatively to each other at a predetermined speed, touching together the two cooperating electrodes, and thereupon abruptly increasing the length of the said path included between said two fixed points at a rate exceeding said predetermined speed, thereby separating the said electrodes and striking an arc therebetween.

3. The method of striking an arc between the arc supporting terminals of cooperating electrodes, one of which is a consuming electrode, comprising the steps of continuously advancing the said consuming electrode toward the arc region along a defined path including two points fixed relatively to each other at a predetermined speed, touching together the arc supporting terminals of said electrodes, and thereupon abruptly deflecting said consuming electrode from said path in such manner as to increase the length of said consuming electrode included between said fixed points at a rate exceeding said predetermined speed, thereby separating the said arc supporting terminals and striking an arc therebetween.

4. Apparatus for starting an electric arc between a fixed electrode and a moving consumable electrode while said consumable electrode is continuously being fed toward said fixed electrode, said apparatus comprising, in combination, non-reversing electrode feed means located at a point a fixed distance from the said fixed electrode for continuously advancing said consumable electrode past said point toward said fixed electrode, means operable upon said consumable electrode beyond said point on the way toward said fixed electrode to retract the tip of said consumable electrode while said electrode is being advanced by said feed means, said electrode retracting means being operable independently of and concurrently with said feed means, and said electrode retracting means being operable to retract said electrode at a rate faster than the feed rate of the electrode and substantially instantaneous operable means actuated by contact of said consumable electrode with said fixed electrode for energizing said electrode retracting means, thereby to separate the electrodes to start the arc.

5. Apparatus according to claim 4, in which the said substantially instantaneously operable means comprises a capacitor, and in which there is provided a source of direct current for charging said capacitor.

6. Apparatus according to claim 5, in which said source of direct current is connected both to said capacitor and to the arc electrodes so that said source of direct current serves both to supply arc current to the electric arc and to charge the said capacitor preparatory to arc starting.

7. Apparatus according to claim 5, together with auxiliary power means connected in operable relationship to said electrode retracting means under control of the arc current for maintaining said electrode retracting means in the energized state independently of said capacitor when the arc has been started and as long as the arc is maintained.

8. Apparatus according to claim 7, together with means to disconnect said auxiliary power means from said electrode retracting means, and a marginal relay having a winding connected across between said arc electrodes for actuating said disconnecting means whenever the voltage between said electrodes exceeds the marginal operating voltage of said marginal relay.

9. Apparatus according to claim 8, together with means in series with the winding of said marginal relay for admitting an abrupt current pulse to said winding while limiting steady-state current therethrough.

10. The method of striking an arc between a consumable electrode and a fixed electrode while said consumable electrode is being fed continuously toward said fixed electrode, comprising the steps of continuously advancing the said consumable electrode past a fixed point located a predetermined distance from the said fixed electrode at a predetermined speed, guiding the arc supporting terminal of the consumable electrode toward the arc supporting terminal of the said fixed electrode, touching the said electrode terminals together, and immediately thereupon retracting the arc supporting terminal of the consumable electrode from contact with the arc supporting terminal of the said fixed electrode at a speed exceeding said predetermined speed by displacing a portion of the consumable electrode between the arc region and the said fixed point, and maintaining said consumable electrode so displaced while continuing to guide the consumable electrode into the arc region.

References Cited by the Examiner

UNITED STATES PATENTS

| | | | |
|---|---|---|---|
| 1,927,896 | 9/1933 | Meller | 314—72 |
| 2,007,751 | 7/1935 | Chapman. | |
| 2,731,536 | 1/1956 | Laur | 219—130 X |

RICHARD M. WOOD, *Primary Examiner.*

JOSEPH V. TRUHE, *Examiner.*